(12) United States Patent
Ahouanto et al.

(10) Patent No.: US 11,312,189 B2
(45) Date of Patent: Apr. 26, 2022

(54) ADAPTER FOR A WHEELED ASSEMBLY AND A WHEELED ASSEMBLY COMPRISING SAME

(71) Applicant: COMPAGNIE GENERALE DES ETABLISSEMENTS MICHELIN, Clermont-Ferrand (FR)

(72) Inventors: Michel Ahouanto, Enval (FR); Arthur Topin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 639 days.

(21) Appl. No.: 16/098,582

(22) PCT Filed: Apr. 25, 2017

(86) PCT No.: PCT/FR2017/050981
§ 371 (c)(1),
(2) Date: Nov. 2, 2018

(87) PCT Pub. No.: WO2017/191390
PCT Pub. Date: Nov. 9, 2017

(65) Prior Publication Data
US 2019/0143761 A1    May 16, 2019

(30) Foreign Application Priority Data

May 2, 2016    (FR) ...................................... 1653957

(51) Int. Cl.
*B60C 15/02* (2006.01)
*B60B 25/04* (2006.01)
(Continued)

(52) U.S. Cl.
CPC ............ *B60C 15/022* (2013.01); *B60B 21/10* (2013.01); *B60B 25/045* (2013.01); *B60B 25/12* (2013.01);
(Continued)

(58) Field of Classification Search
CPC . B60C 15/022; B60C 15/0226; B60C 15/023; B60C 15/0209; B60B 21/125;
(Continued)

(56) References Cited

U.S. PATENT DOCUMENTS 1,593,877 A * 7/1926 Littman ................... B60B 25/04
301/35.3
4,373,567 A * 2/1983 Declercq ................. B60B 21/10
152/379.3
(Continued)

FOREIGN PATENT DOCUMENTS

| FR | 3014362 A1 | 6/2015 |
|---|---|---|
| FR | 3026054 A1 | 3/2016 |
| WO | 2015091620 A1 | 6/2015 |

OTHER PUBLICATIONS

International Search Report dated Aug. 2, 2017, in corresponding PCT/FR2017/050981 (4 pages).

*Primary Examiner* — Scott A Browne
(74) *Attorney, Agent, or Firm* — Venable LLP

(57) ABSTRACT

An adapter, for a rolling assembly having an axis of rotation and comprising a tyre (P) having two beads (B), and a rim (J), provides the connection between one of the beads (B) and the rim (J), the said rim having two rim seats (7), the said adapter having an axially inner end (10) intended to be mounted on the rim seat (7) and comprising an inner reinforcing element (16), the said reinforcing element (16) having a centre $C_2$, an axially outer end (9) comprising an outer reinforcing element (15), the said reinforcing element (15) having a centre $C_1$, a body (11) that connects the said
(Continued)

outer end (9) to the said inner end (10) so as to form a single piece and comprises at least one main reinforcement that provides the connection between the said outer reinforcer and the said inner reinforcer, and comprises a first end (17A) and a second end (17B), a substantially cylindrical adapter seat (18) intended to receive one of the said beads (B), the said seat (18) being situated at the axially outer end (9) of the said body (11), an adapter bearing face (21) substantially contained in a plane perpendicular to the axis of rotation, the said bearing face being situated on the axially inner face of the axially outer end (9), and an overall length L and a length LT measured between the centres $C_1$ and $C_2$. The first end (17A) and the second end (17B) of the reinforcement are arranged one upon the other so as to form an overlap.

8 Claims, 4 Drawing Sheets

(51) Int. Cl.
  *B60B 21/10* (2006.01)
  *B60B 25/12* (2006.01)
  *B60B 21/12* (2006.01)

(52) U.S. Cl.
  CPC ...... *B60C 15/0209* (2013.01); *B60C 15/0226* (2013.01); *B60B 21/125* (2013.01); *B60B 2900/523* (2013.01); *B60C 15/023* (2013.01)

(58) Field of Classification Search
  CPC .. B60B 2900/523; B60B 25/045; B60B 25/12
  See application file for complete search history.

(56) References Cited

U.S. PATENT DOCUMENTS

| | | |
|---|---|---|
| 5,232,034 A | 8/1993 | Gergele |
| 6,626,217 B2 * | 9/2003 | Bestgen .............. B60C 15/0203 |
| | | 152/379.4 |
| 2016/0101581 A1 * | 4/2016 | Sandstrom ............... C08K 3/04 |
| | | 152/541 |
| 2016/0311255 A1 | 10/2016 | Ahouanto et al. |
| 2017/0001472 A1 | 1/2017 | Ahouanto et al. |
| 2019/0135049 A1 | 5/2019 | Merino et al. |
| 2019/0143762 A1 | 5/2019 | Barguet et al. |

* cited by examiner

ADAPTER FOR A WHEELED ASSEMBLY AND A WHEELED ASSEMBLY COMPRISING SAME

BACKGROUND

The invention relates to an adapter for a rolling assembly formed mainly of a tyre and of a rim, and to a rolling assembly comprising the said adapter.

A reminder of the definitions used in the present invention is given below:
"axial direction": direction parallel to the axis of rotation of the tyre,
"radial direction": direction intersecting the axis of rotation of the tyre and perpendicular thereto,
"circumferential direction": direction perpendicular to a radius and comprised in a plane perpendicular to the axis of rotation of the tyre,
"radial section": section in a plane containing the axis of rotation of the tyre,
"equatorial plane": plane perpendicular to the axis of rotation and passing through the middle of the tread.

Insertion of an elastic adapter between the rim and the beads of a tyre is already known from application WO2015091618. This adapter is elastically deformable in the radial and axial directions. Such an adapter makes it possible to separate that part of the rolling assembly that can be considered to actually act as a tyre from that part of the rolling assembly that can be considered to act as a rim.

However, although such an assembly also makes it possible to ensure the functions of a conventional tyre, notably a drift thrust response of the tyre following the application of a drift angle to the tyre, thereby giving the assembly sufficient flexibility for it to avoid any surface deterioration or depth deterioration, it does not exhibit sufficient endurance at very high speed over extended periods of time.

Hence there is still the need to procure a new adapter that makes it possible to provide better endurance over time when running at very high speed such as 250 km/h without damage to the internal structure of the adapter.

SUMMARY

The subject of the invention is thus an adapter for a rolling assembly having an axis of rotation and comprising:
a tyre having two beads, and
a rim,
the said adapter providing the connection between one of the beads and the rim, the said rim having two rim seats,
the said adapter having:
  an axially inner end intended to be mounted on the rim seat and comprising an inner reinforcing element, the said reinforcing element having a centre $C_1$,
  an axially outer end comprising an outer reinforcing element, the said reinforcing element having a centre $C_2$,
  a body that connects the said outer end to the said inner end so as to form a single piece and comprises at least one main reinforcement that provides the connection between the said outer reinforcer and the said inner reinforcer,
  a substantially cylindrical adapter seat intended to receive one of the said beads, the said seat being situated at the axially outer end of the said body,
  an adapter bearing face substantially contained in a plane perpendicular to the axis of rotation, the said bearing face being situated on the axially inner face of the axially outer end,
  an overall length L and a length LT measured between the centres $C_1$ and $C_2$.

The adapter is characterized in that the first end and the second end of the reinforcement are arranged one upon the other so as to form an overlap.

The adapter according to the invention has the advantage of having a simple design and being easy to mount. The adapter according to the invention also makes it possible to ensure sufficient coupling owing to the fact that the superposed ply portions guarantee sufficient coupling.

Another subject of the invention is a rolling assembly having an axis of rotation and comprising:
a tyre having two beads,
a rim,
the said adapter providing the connection between one of the beads and the rim,
the said rim having two rim seats,
the said adapter having:
  an axially inner end intended to be mounted on the rim seat and comprising an inner reinforcing element, the said reinforcing element having a centre $C_1$,
  an axially outer end comprising an outer reinforcing element, the said reinforcing element having a centre $C_2$,
  a body that connects the said outer end to the said inner end so as to form a single piece and comprises at least one main reinforcement that provides the connection between the said outer reinforcer and the said inner reinforcer,
  a substantially cylindrical adapter seat intended to receive one of the said beads, the said seat being situated at the axially outer end of the said body,
  an adapter bearing face substantially contained in a plane perpendicular to the axis of rotation, the said bearing face being situated on the axially inner face of the axially outer end,
  an overall length L and a length LT measured between the centres $C_1$ and $C_2$.

This rolling assembly is characterized in that the first end and the second end of the reinforcement are arranged one upon the other so as to form an overlap.

The axially outer end of the adapter axially delimits a "housing intended to receive the bead of the tyre". The bearing face of the axially outer end serves to support, in the axial direction, the bead of the tyre in the manner of a rim flange.

Thus, the housing receives the bead of the tyre in exactly the same way as the seat of a rim conventionally would. The tyre is therefore axially immobilized by the inflation pressure and is pressed firmly against the bearing face of this axially outer end, in the manner of what happens conventionally in the case of the bead of a tyre against the rim flange of a rim.

The axially inner end of the adapter may be denoted "adapter bead" since it is intended to couple the adapter to the rim flange of a rim in the same way as is conventionally done by the bead of a tyre.

For preference, the overlap has a length «l» greater than or equal to 0.2L and less than or equal to 0.5L.

For preference, the overlap has a length «l» less than or equal to 0.6LT.

For preference, the reinforcement comprises a ply comprising reinforcers coated in an elastomer composition, the said reinforcers being mutually parallel and making an angle comprised between 0° and 90° with the circumferential direction. More preferably, the reinforcers make an angle comprised between 30° and 60° with the circumferential direction.

The reinforcers may have a pitched spacing comprised between 0.3 times the diameter of the reinforcer and 3 times the diameter of the reinforcer.

The reinforcers may be selected from reinforcers such as textile (PET, polyester, rayon), metal or fibres (carbon, glass)/resin.

The outer reinforcer arranged at the outer end may substantially exhibit symmetry of revolution about an axis and may comprise an internal layer and an external layer comprising at least one external layer thread wound in a helix around the internal layer over a number of circumferential turns, the external layer thread or threads comprising the first part coated with the first coating.

Circumferential turn means winding around the main axis of the reinforcing element and extending in the circumferential direction around this axis. Because the external layer thread is wound in a helix about the external layer, each circumferential turn oscillates on either side of a midplane (which means to say a plane passing through the centre of the internal layer) substantially perpendicular to the axis of the reinforcing element.

For preference, the outer reinforcer comprises an intermediate layer comprising at least one intermediate layer thread wound in a helix around the internal layer over several circumferential turns, the external layer thread or threads being wound in a helix around the intermediate layer over several circumferential turns.

The outer reinforcer may also substantially exhibit symmetry of revolution about an axis and may comprise several circumferential turns of at least one thread arranged axially next to one another over several layers which are radially superposed on one another.

When the mounted assembly comprises two adapters, the latter may be symmetrical or non-symmetrical. The concept of symmetry or asymmetry of the adapter is defined by the axial length of the body of the adapter. Two adapters are asymmetrical when the body of one of them has an axial length greater than that of the other.

BRIEF DESCRIPTION OF THE DRAWINGS

For preference, the rolling assembly according to the invention comprises a first and a second adapter that each have a body with different or identical lengths.

The invention will now be described with the aid of examples and figures which follow and which are given purely by way of illustration, and in which.

DETAILED DESCRIPTION

Figure 1:
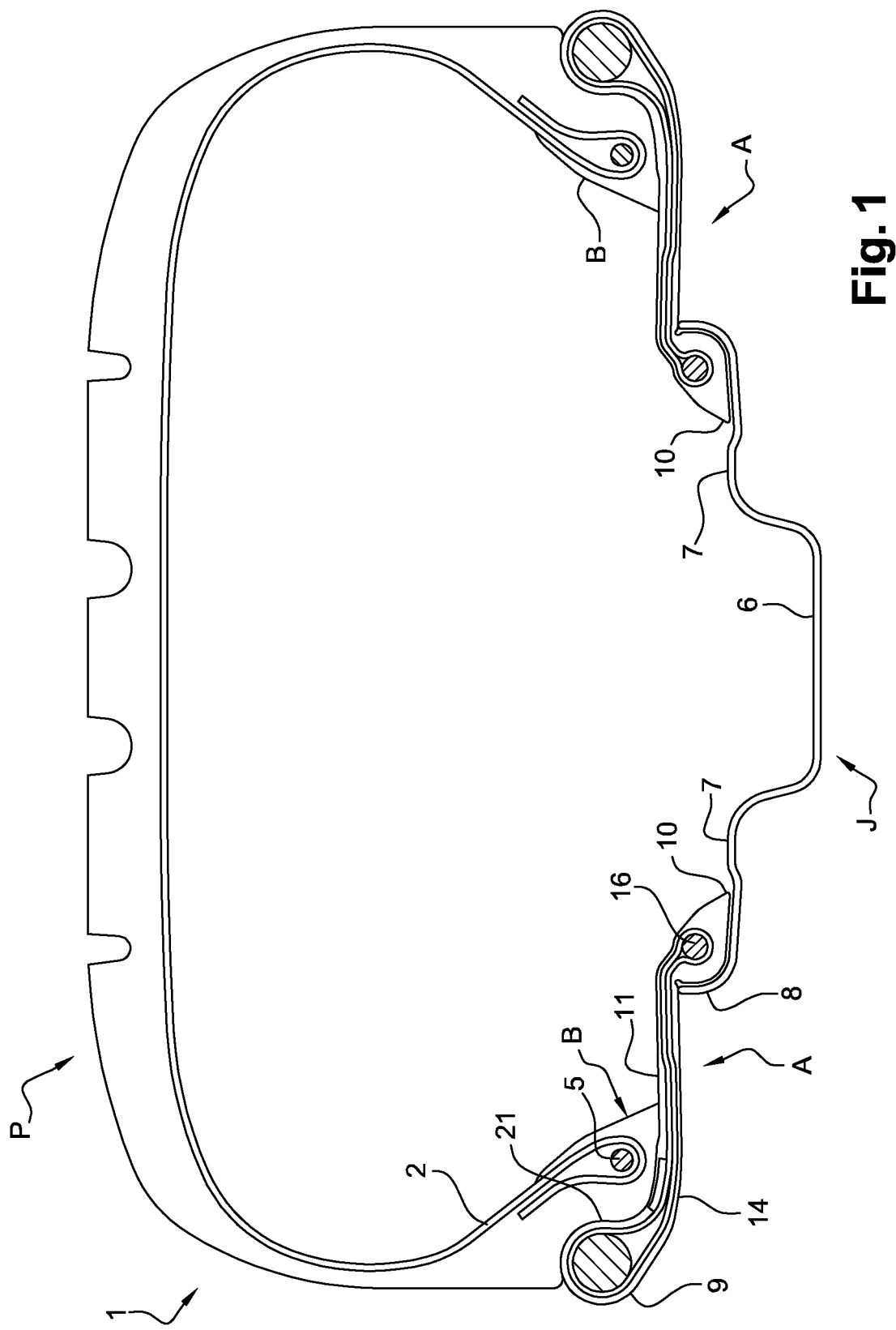
FIG. 1 depicts, schematically and in radial section, a tyre mounted on two adapters according to the invention, which are themselves fitted on the rim in a removable manner.

FIG. 1 depicts a mounted assembly comprising two adapters A according to the invention that connect the beads B of the tyre P to the two rim flanges 8 of the rim J. The adapters in this FIG. 1 are detachable from the rim J and from the beads B of the tyre.

The tyre, of which the design per se is unaltered in the invention, is formed of a tread reinforced by a crown reinforcement joined to two beads B on either side of an equatorial plane XX' by way of two sidewalls 1. A carcass reinforcement 2 that mainly reinforces the sidewalls 1 is anchored in each bead B to at least one bead wire, in this case of the "braided" type 3, so as to form turn-ups 4 that are separated from the main part of the carcass reinforcement by profiled elements 5 having a quasi triangular shape.

It is important to note that the invention can be implemented with a very large number of types of tyre, be they radial tyres or cross-ply tyres, or even with tyres of the type having self-supporting sidewalls.

The rim J comprises a groove 6, known as a well, that connects, on either side of the equatorial plane, two rim seats 7 that are axially extended by rim flanges 8, the radially outer edges of which are curved over.

The adapter A mainly comprises an axially outer end 9 having a centre $C_1$, an axially inner end 10 having a centre $C_2$ and a body 11 connecting the said end 9 to the said end 10.

The axially outer end 9 comprises an outer reinforcing element 20. During the mounting of the tyre, the bead seat for the bead B is fitted into the space created by this outer reinforcing element 20.

The adapter A, which is positioned at each bead B of the tyre, may be symmetrical or non-symmetrical. Symmetry is defined as meaning that the overall length of the body 11 is identical on the two adapters. When the assembly (tyre, rim and adapter) is mounted, the beads B of the tyre are positioned on the adapter seat 14 and made to bear axially against a bearing face 21.

Figure 2:
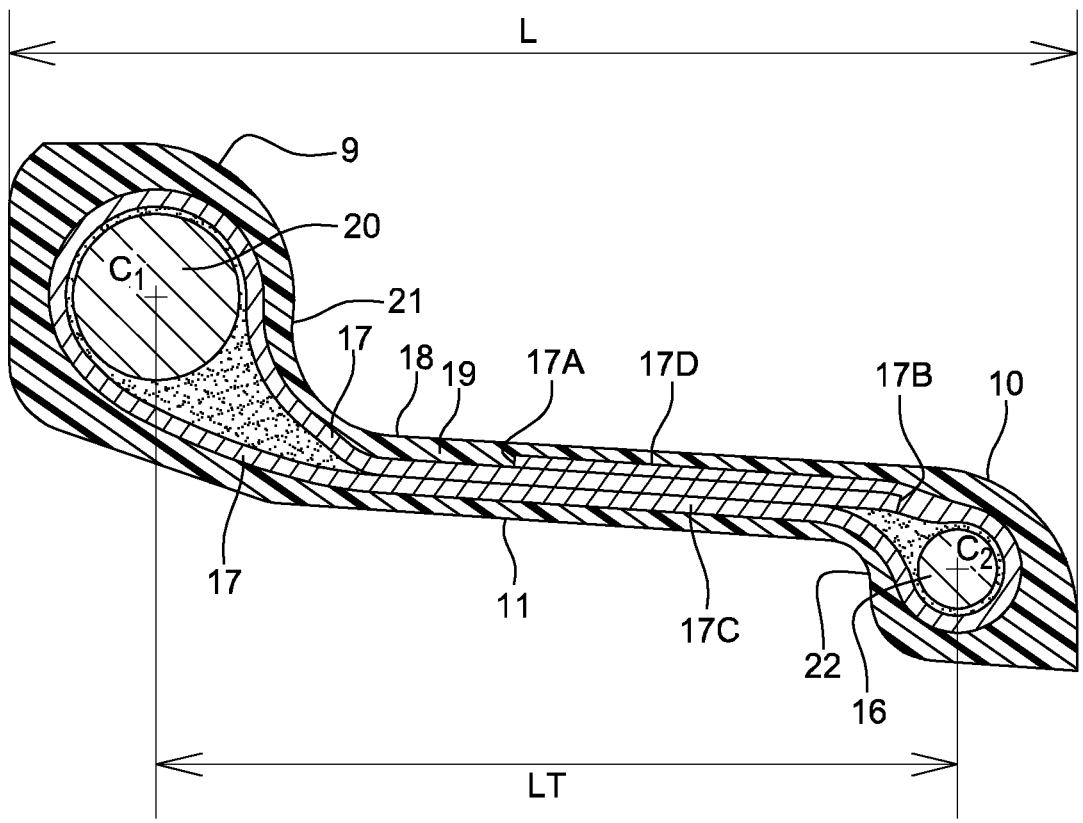
FIG. 2 depicts, schematically and in radial section, a non-fitted adapter according to the invention, and according to a first embodiment.

FIG. 2 depicts an adapter according to the invention which is not mounted on a rim. This adapter comprises, on the one hand, an axially outer end 9 with an outer reinforcer 20 having a substantially spherical or polygonal geometric shape in section, consisting of a composite material such as glass-fibre-reinforced plastic, and, on the other hand, an axially inner end 10 with a metal reinforcer 16, and finally a body 11 comprising a ply 17 made up of textile cords and elastomer. The cords of the ply are mutually parallel. The said ply 17 is, on the one hand, attached axially on the inside and radially on the outside to the walls of the reinforcer 20, and on the other hand, anchored, in the end 10, to the metal reinforcer 16, so as to form a turn-up at each end 9, 10 of the adapter. The ply 17 comprises a first end 17A and a second end 17B. The ply 17 comprises a part 17C arranged radially on the inside of a part 17D.

The adapter has an overall length between each end equal to L, and a length LT measured between the centres $C_1$ and $C_2$.

The ply 17 comprises two ends 17A and 17B arranged one upon the other so as to form a region of overlap having an overall length "l" comprised between 0.2L and 0.5L. The ply 17 is coated in known elastomer composition 19.

The body 11 comprises a substantially cylindrical adapter seat 18 intended to receive a bead of the tyre arranged at the axially outer end of the body 11.

The body 11 also comprises an adapter bearing face 21 that is substantially contained in a plane perpendicular to the axis of rotation, is situated on the axially inner face of the axially outer end, and is intended to keep the bead in place in its housing.

According to FIG. 2, in the region of overlap, the first end 17A is arranged radially on the outside of the second end 17B. The end 17B is sandwiched between the ply part 17C and the ply part 17D.

Figure 3:
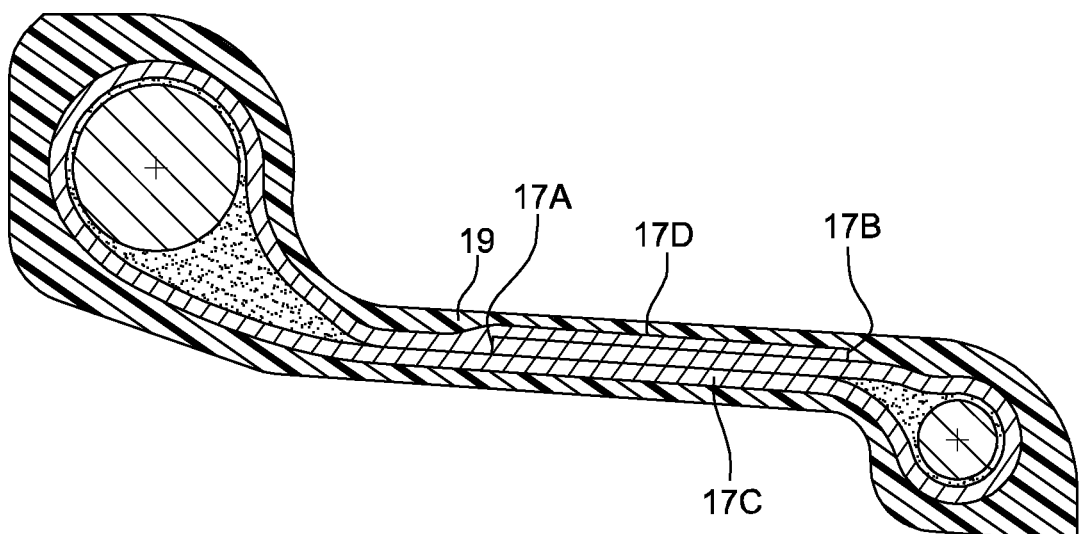
FIG. 3 depicts, schematically and in radial section, a non-mounted adapter according to the invention and according to a second embodiment.

FIG. 3 differs from FIG. 2 in that the first end 17A is arranged radially on the inside of the second end 17B. The end 17A is sandwiched between the ply part 17C and the ply part 17D.

In FIGS. 2 and 3, the region of overlap is arranged radially on the outside of the part 17C of the ply 17.

Figure 4:
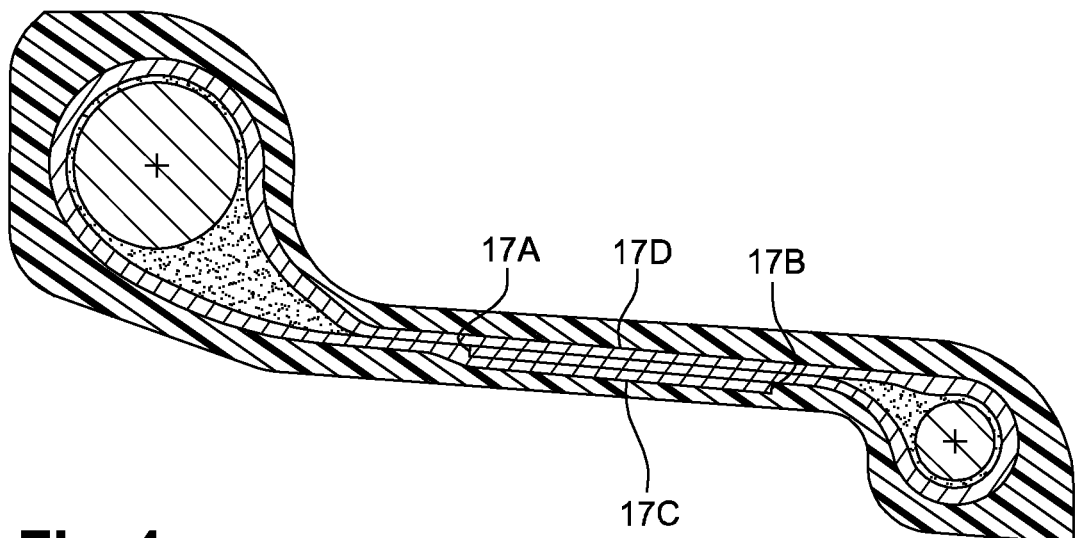
FIG. 4 depicts, schematically and in radial section, a non-mounted adapter according to the invention and according to a third embodiment.
Figure 5:
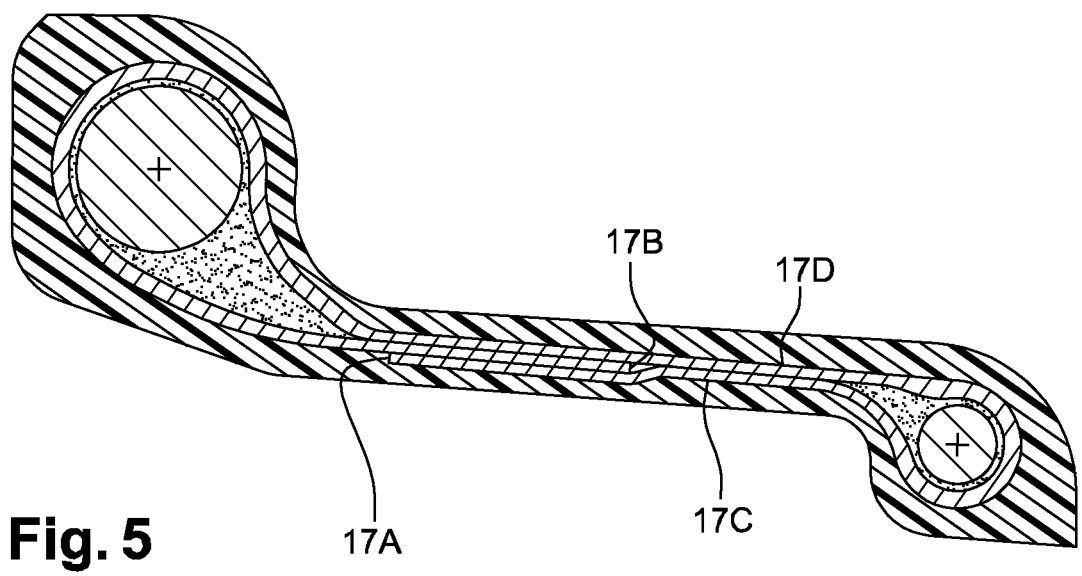
FIG. 5 depicts, schematically and in radial section, a non-mounted adapter according to the invention and according to a fourth embodiment.

In FIGS. 4 and 5, the region of overlap is arranged radially on the inside of the part 17C of the ply 17.

FIG. 4 is the counterpart to FIG. 3. The end 17A is sandwiched between the ply part 17C and the ply part 17D.

FIG. 5 is the counterpart to FIG. 2. The end 17B is sandwiched between the ply part 17C and the ply part 17D.

Figure 6:
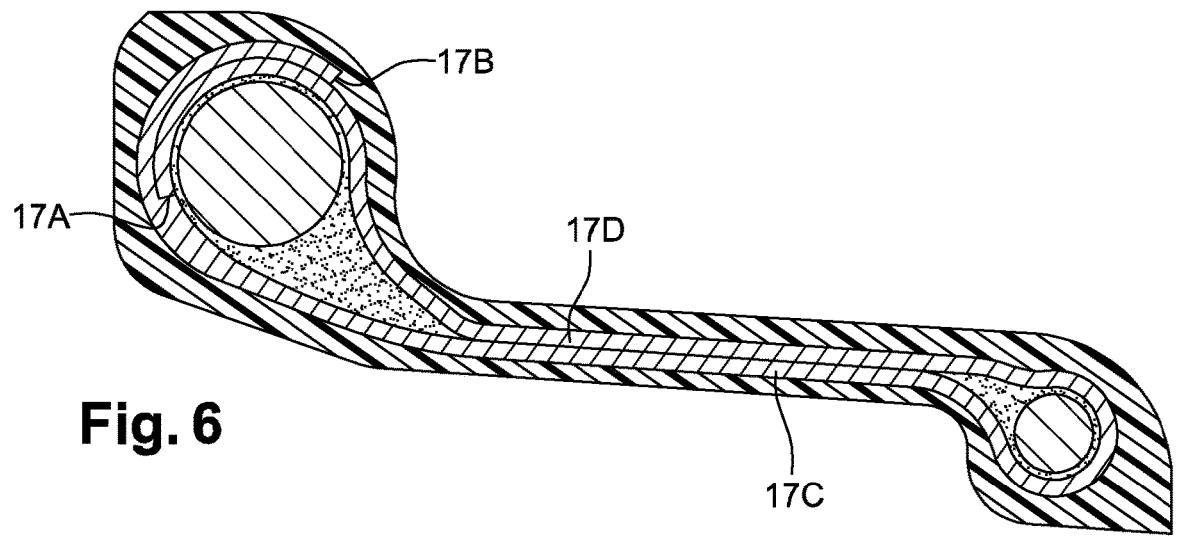
FIG. 6 depicts, schematically and in radial section, a non-mounted adapter according to the invention and according to a fifth embodiment.
Figure 7:
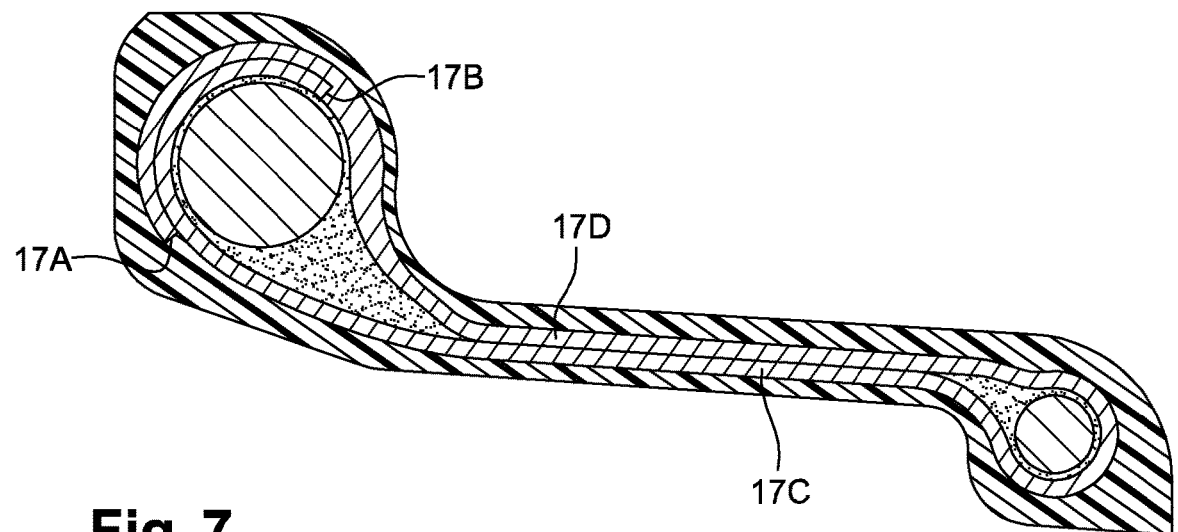
FIG. 7 depicts, schematically and in radial section, a non-mounted adapter according to the invention and according to a sixth embodiment.

In FIGS. 6 and 7, the region of overlap is arranged radially to the outer reinforcing element 20. In FIG. 6, the end 17A is sandwiched between the part 17C and the outer reinforcing element 20. In FIG. 7, the end 17B is sandwiched between the part 17D and the outer reinforcing element 20.

The following example shows the results obtained with the adapter according to the invention.

Example: High-Speed Endurance Tests

This test consists in running the wheel at an initial speed of 250 km/h and of increasing this speed by 2 km/h over the course of 20 h in order to obtain a final speed of 290 km/h.

An adapter according to the invention has an overall length L=65.35 mm and a length of overlap l=30 mm namely 45% of the overall length.

It is found that a wheel fitted with such an adapter performs the test without any damage, unlike a wheel comprising a known adapter with no overlap in the reinforcement.

The invention claimed is:

1. An adapter for a rolling assembly having an axis of rotation and comprising a tire having two beads and a rim, the adapter providing the connection between one of the beads and the rim, the rim having two rim seats, and the adapter having:
    an axially inner end intended to be mounted on a rim seat and comprising an inner reinforcing element, the inner reinforcing element having a center $C_2$;
    an axially outer end comprising an outer reinforcing element, the outer reinforcing element having a center $C_1$;
    a body that connects the axially outer end to the axially inner end so as to form a single piece and comprises at least one main reinforcement that provides the connection between the outer reinforcing element and the inner reinforcing element, and comprises a first end and a second end, wherein the at least one main reinforcement is attached axially on an inside and radially on an outside to a wall of the outer reinforcing element, and anchored to the inner reinforcing element, so as to form an upturn at both the axially inner end and the axially outer end of the adapter;
    a substantially cylindrical adapter seat intended to receive one of the beads, the seat being situated at the axially outer end of the body;
    an adapter bearing face substantially contained in a plane perpendicular to the axis of rotation, the adapter bearing face being situated on an axially inner face of the axially outer end; and
    an overall length L and a length LT measured between the centers $C_1$ and $C_2$,
    wherein the first end and the second end of the at least one main reinforcement are arranged one upon the other so as to form an overlap to ensure coupling between superposed ply portions of the at least one main reinforcement.

2. The adapter according to claim 1, wherein the overlap has a length l greater than or equal to 0.2L and less than or equal to 0.5L.

3. The adapter according to claim 1, wherein the overlap has a length l less than or equal to 0.6LT.

4. The adapter according to claim 1, wherein the at least one main reinforcement comprises a ply comprising reinforcers coated in an elastomer composition, the reinforcers being mutually parallel and making an angle comprised between 0° and 90° with the circumferential direction.

5. A rolling assembly having an axis of rotation and comprising a tire having two beads, a rim, and an adapter providing the connection between one of the beads and the rim, the rim having two rim seats, and the adapter having:
    an axially inner end intended to be mounted on a rim seat and comprising an inner reinforcing element, the inner reinforcing element having a center $C_2$;
    an axially outer end comprising an outer reinforcing element, the outer reinforcing element having a center $C_1$;
    a body that connects the axially outer end to the axially inner end so as to form a single piece and comprises at least one main reinforcement that provides the connection between the outer reinforcing element and the inner reinforcing element, and comprises a first end and a second end, wherein the at least one main reinforcement is attached axially on an inside and radially on an outside to a wall of the outer reinforcing element, and anchored to the inner reinforcing element, so as to form an upturn at both the axially inner end and the axially outer end of the adapter;
    a substantially cylindrical adapter seat intended to receive one of the beads, the seat being situated at the axially outer end of the body;
    an adapter bearing face substantially contained in a plane perpendicular to the axis of rotation, the adapter bearing face being situated on an axially inner face of the axially outer end; and
    an overall length L and a length LT measured between the centers $C_1$ and $C_2$,
    wherein the first end and the second end of the at least one main reinforcement are arranged one upon the other so as to form an overlap to ensure coupling between superposed ply portions of the at least one main reinforcement.

6. The rolling assembly according to claim 5, wherein the overlap has a length l greater than or equal to 0.2L and less than or equal to 0.5L.

7. The rolling assembly according to claim 5, wherein the overlap has a length l less than or equal to 0.6LT.

8. The rolling assembly according to claim 5, wherein the at least one main reinforcement comprises a ply comprising reinforcers coated in an elastomer composition, the reinforcers being mutually parallel and making an angle comprised between 0° and 90° with the circumferential direction.

\* \* \* \* \*